JOSEPH A. CODY.
Improvement in Car-Brakes and Starters.

No. 114,529.  Patented May 9, 1871.

Witnesses:
John F. Fennell
Newton Cranford

Inventor:
J. A. Cody

UNITED STATES PATENT OFFICE.

JOSEPH A. CODY, OF CLEVELAND, OHIO.

IMPROVEMENT IN CAR BRAKES AND STARTERS.

Specification forming part of Letters Patent No. 114,529, dated May 9, 1871.

*To all whom it may concern:*

Be it known that I, JOSEPH A. CODY, of Cleveland, in the county of Cuyahoga, in the State of Ohio, have invented certain Improvements in Brakes for Railway-Cars, of which the following is a specification.

The object of this invention is to provide a better and more efficient means of applying brakes to the wheels of cars or other carriages or wagons used for heavy transportation, either on railways or other roads, so that the car or wagon can be effectually retarded or fully stopped in its motion.

Figure 1:
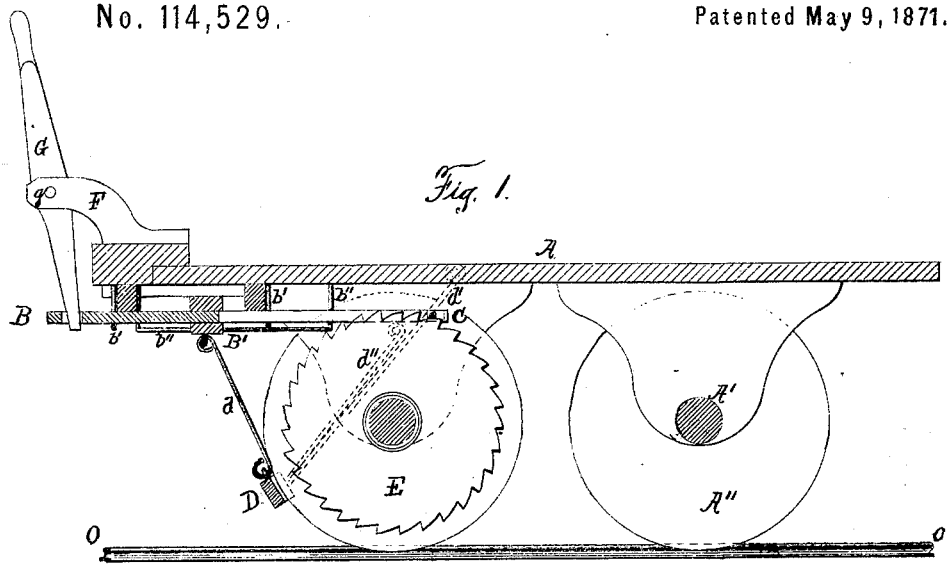
Figure 2:
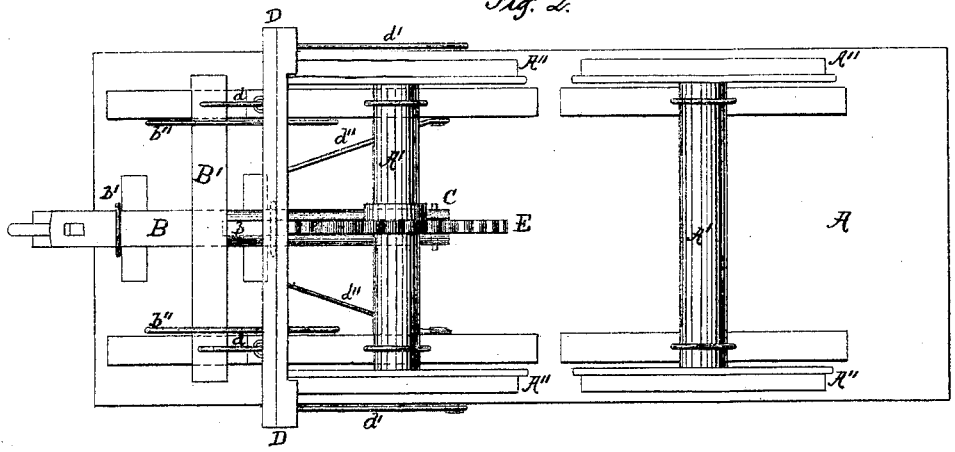

In the accompanying drawings, Figure 1 represents an upright longitudinal sectional view of a car having my improvements attached. Fig. 2 is a plan view of the under side of the same car, and in which—

A represents the platform or floor of the car, A' the axles, A'' the wheels, which are all common devices, and need no especial description.

B is the draw-bar, by which the car or vehicle is put in motion, and it is slotted at $b$ to the back end. This draw-bar is arranged so as to slide back and forward in a horizontal position, and is secured for that purpose by means of the metal loops $b'$, which allow it to reciprocate longitudinally, but not laterally. Upon the draw-bar is a cross-tree, B', which is firmly secured to the said draw-bar at or near the center of its length, and is held in its position at its ends by guide-rods $b''$ $b''$, which guide-rods allow the cross-tree to reciprocate with the draw-bar a sufficient distance to produce the motion that is desired, and it is there stopped by coming in contact with any substantial means for arresting its farther reciprocation in that direction, and a similar arrangement is attached to arrest the reciprocation in the other direction. To this cross-tree B', by means of eyebolts or hinges, the brace-rods $d$ $d$ are connected with and attached to brake D, and upon the rear side of the brake D are firmly attached brace-rods $d'$ $d'$ and $d''$ $d''$, which are pivoted or hinged to the side or other part of the platform A or trucks that contain the bearing of the wheels. At the rear end of the slot in the draw-bar is a cross-bolt or pin, C, the office of which will hereinafter be more fully described. On the centers of each of the outer or end axles is firmly attached a toothed wheel, E. The serrations or teeth set forward in one direction only, and are not unlike the teeth of a circular saw. This toothed wheel enters into the slot $b$ of the draw-bar B, as seen in Fig. 1 of the drawings.

It will be seen by this construction and application of devices to a car that, if it is a horse-car, when the signal is given for the car to stop by the conductor the driver pulls in the reins and stops the horses, and as the horses stop, the pole, which is attached to the draw-bar, stops also before the car, which is moved forward by its own momentum, sliding upon the draw-bar, which, with the cross-tree B', is forced back under the car, carrying with the cross-tree the brace-rods $d$ $d$ and brakes D until the brakes D are forced against the wheels A'' and stop their revolution and bring the car to a standstill without the aid of any other agency than the motion of the car acting through these devices upon itself, and the horses keeping the pole, and thereby the draw-bar B, from moving forward with the car.

To start the car and relieve the wheels from the pressure of the brakes, it is only necessary to start the horses forward, which acts to draw the draw-bar forward, and with it the cross-bar B, which relieves the wheels A'' from the brakes D, and at the same time the pin or bolt C at the rear end of the slot in draw-bar B engages the nearest tooth in wheel E and causes it to make a forward rotation and put the car in motion without the jerk that is usually felt in the ordinary way of starting cars, and thus dispensing with the constant attention of the driver to operate, at great disadvantage, a crank-brake to stop the cars, and then relieving the wheels from the brake when the signal is given to go ahead again.

An auxiliary device for applying the brakes to the wheels may be used by having a pivoted lever, as seen in Fig. 1 at G, arranged to be connected with the draw-bar B at both ends of a car, so the conductor can at any time, when necessary, apply the brakes to a pair of wheels. In some horse-cars on street-railways no pole is used, by which the horses are attached to the car, and when that is the case this lever G is essential, as either the driver or conductor can apply the brakes at will and at either end of the car, as in that case such lever will be located at each end of the car.

This invention can be readily applied to a car drawn by steam-power, and its effect upon a car or train of cars is easily understood, for when by any means the locomotive is slackened in its speed, so that the momentum of the cars in its rear will advance at greater speed that the locomotive, that very act applies the brakes, as has been described as being the case in street-rail cars when the horses are stopped. It can also be applied to transportation-wagons on common roads at descending grades on the same principle without departing from the spirit of my invention, as the operation of braking or starting the cars is the same wherever applied to this kind of vehicle.

Having thus fully described my invention, what I claim as new, and desire to secure by Letters Patent, is—

The combination of the sliding slotted draw-bar B, cross-tree B', hinged rods $d\ d$, brake D, suspending-rods $d'$ and $d''$, when constructed and arranged to operate together in the manner and for the purpose substantially as described.

J. A. CODY.

Witnesses:
JOHN F. FENNELL,
EDM. F. BROWN.